No. 773,125. PATENTED OCT. 25, 1904.
A. F. CHRISTMAS.
ELECTRIC MOTOR SYSTEM.
APPLICATION FILED DEC. 4, 1903.
NO MODEL.
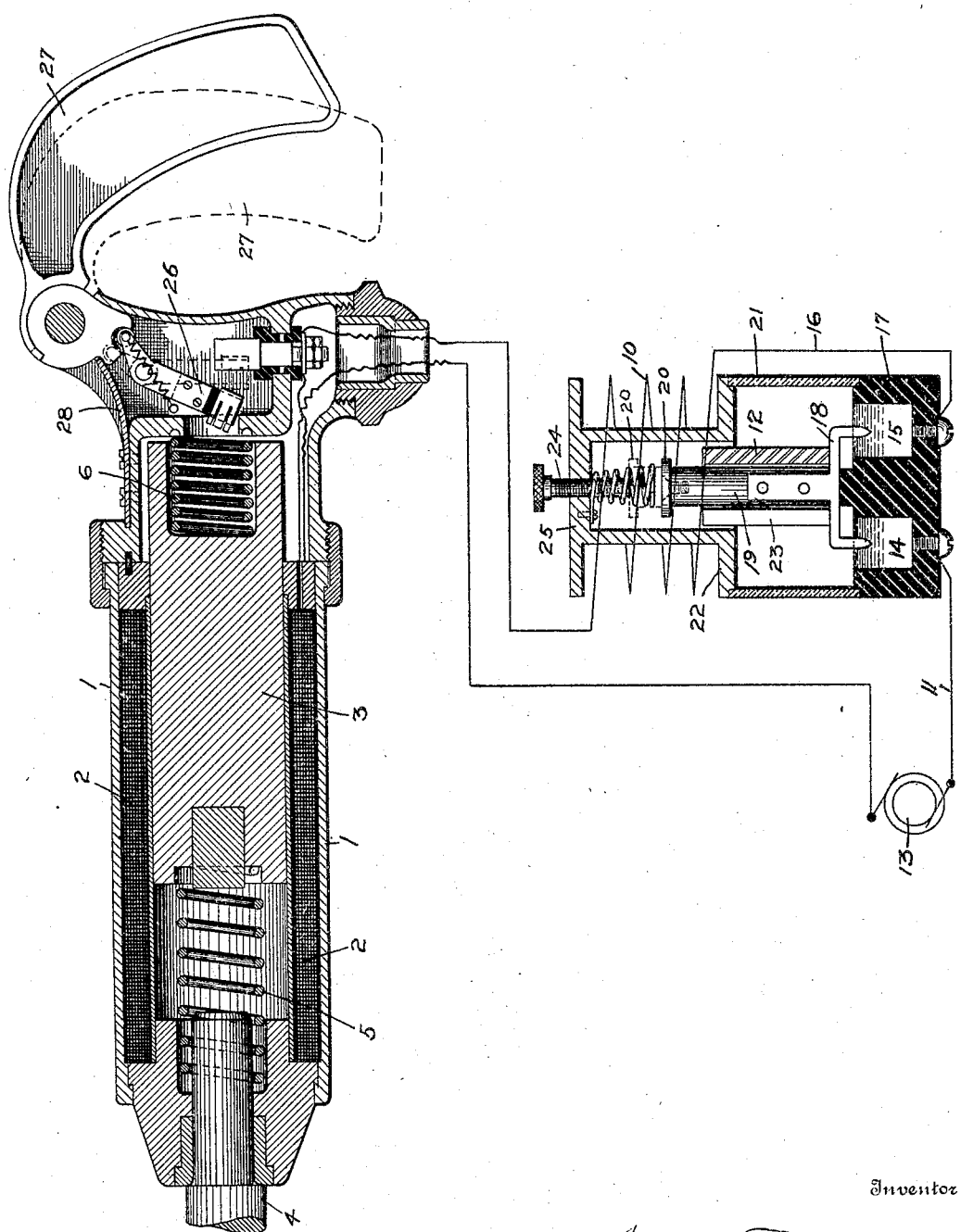
Witnesses
J. R. Keller
Geo. B. Rowley.
Inventor
Adolph F. Christmas
By
Kay Totten + White
Attorneys No. 773,125.

Patented October 25, 1904.

UNITED STATES PATENT OFFICE.

ADOLPH F. CHRISTMAS, OF PITTSBURG, PENNSYLVANIA, ASSIGNOR OF TWO-THIRDS TO FRANK R. McFEATTERS, OF WILKINSBURG, PENNSYLVANIA.

ELECTRIC-MOTOR SYSTEM.

SPECIFICATION forming part of Letters Patent No. 773,125, dated October 25, 1904.

Application filed December 4, 1903. Serial No. 183,837. (No model.)

*To all whom it may concern:*

Be it known that I, ADOLPH F. CHRISTMAS, a resident of Pittsburg, in the county of Allegheny and State of Pennsylvania, have invented a new and useful Improvement in Electric-Motor Systems; and I do hereby declare the following to be a full, clear, and exact description thereof.

My invention relates to electric-motor systems, and more especially to a system for operating reciprocating motors.

The object of my invention is to provide such a system wherein a reciprocating motor of simple design may be employed and whereby the circuit will be automatically broken and made in a manner so that the periods of said current can be regulated.

The accompanying drawing shows a diagram of the system, the motor and the circuit maker and breaker being shown in section.

My invention is intended to operate reciprocating electric motors having only a single coil. Such a motor is shown in the drawing and has been illustrated as a reciprocating hammer. This motor is provided with a suitable frame or casing 1, having therein a single coil 2. With this coil coöperates the core or armature 3, which in its reciprocation performs the desired work—such, for instance, as operating a tool 4. The active or working stroke of the core 3 is secured by the energization of the coil 2, and its idle or rearward stroke is secured by means of a helical spring 5 or the like interposed between said core and a stationary part of the casing. Preferably also a spring 6 will be placed at the opposite end of the core and serves not only to cushion the same, but also to start it on its return or active stroke.

In the operation of a motor of this kind it is necessary that the current through the coil be an interrupted or intermittent one, so as to alternately energize and deënergize the said coil. For the best efficiency of the motor it is essential that the frequency of the current be not too high—much lower, for instance, than ordinary commercial alternating currents. Accordingly I provide suitable means for making and breaking the circuit to this motor, which means is so arranged that it will interrupt both direct and alternating currents. Such circuit-interrupting device preferably is automatic, and I have shown for this purpose the circuit-breaker described and claimed by me in application filed June 22, 1903, Serial No. 162,570. This device comprises a magnet-coil, such as the solenoid 10, which is placed in series in the circuit—as, for instance, in the main 11. The armature 12 of said magnet is connected to suitable circuit-terminals and so arranged as to separate them when the circuit at the motor is closed. The circuit wire or main 11, coming from the generator 13, is connected to a mercury-cup 14. A companion mercury-cup 15 is placed in proximity thereto, and to this is connected the circuit-wire 16, which leads to the motor. The mercury-cups 14 and 15 are formed in a block of insulating material 17, and in order to close the circuit said cups are bridged by means of a suitable metallic piece, such as the copper fork 18. This fork is attached to a piece of fiber 19 or other insulating material, which at its upper end is provided with an enlargement, such as the washer 20, and is surrounded by the core 12 of the solenoid 10. All of the movable parts are inclosed by means of a tube or casing 21, closed at the top by the spool or bobbin 22 of the solenoid. Preferably the solenoid-core 12 is split, having the gap 23 therein, so as to prevent the formation of eddy-currents. The solenoid-core 12 is preferably of less length than the distance between the fork 18 and washer 20, so that upon the energization of the magnet the core will be free to move upwardly slightly before it begins to raise the fork 18. By varying the distance between the top of this core and the washer 20 the time that the circuit remains closed can be regulated. The rapidity of the upward movement of the core can also be varied by varying the number of turns of the solenoid, and this also will affect the length of time the circuit remains closed. As soon as the core comes into contact with the washer 20 it will lift the fork out of the mercury-cups, thus breaking the circuit. This immediately deënergizes the solenoid, so that said core will drop, thus permitting the fork 18 to drop back into the mercury-cups and again close the circuit. This again immediately energizes the magnet, so that the core is again raised and will again break the circuit, and this operation will continue automatically and repeatedly as long as the circuit remains closed at the motor. As a consequence the coil of the motor will be alternately energized momentarily and deënergized, thus causing the reciprocation of the core 3 thereof. The circuit-closing device 18 drops by gravity, and as a consequence an appreciable interval of time will elapse between the breaking of the circuit and the moment when it is again made. This interval of time depends upon the distance through which the circuit-closing device 18 must drop. If this distance be comparatively large, the interval of time will be correspondingly great and the number of pulsations of the current correspondingly low, whereas if the distance through which this device falls is small the time interval will be short and the number of pulsations of the current correspondingly high. Means will therefore preferably be provided for regulating the distance through which the circuit-closing device 18 is raised, thus determining the distance through which said device must fall by gravity and determining the time interval of the current. Consequently if suitable adjustable means be provided for limiting the upward movement of the core the distance through which the circuit-closing device 18 must fall will be regulated. A convenient means for accomplishing this is a suitable adjusting-screw 24 passing through the head 25 of the spool and in the path of movement of the circuit-closing device.

A suitable circuit-closer will be provided either at the motor or other convenient place for setting the same in operation. This circuit-closer may be of any well-known type; but with a reciprocating tool such as shown I prefer to use a pivoted switch-blade 26 and have the handle of the tool 27 pivoted to the casing thereof and arranged so that when the tool is pressed against its work the handle will move inwardly. Suitable operative connections are provided between said handle and the switch-blade, so that when said handle is moved inwardly said blade will be moved to close the circuit, thus putting the tool in operation by the mere act of pressing it against its work. As soon as the tool is withdrawn from its work the handle will move away from the casing either by the act of the operator or through the action of a spring 28 so arranged as to press said handle outwardly, thus opening the switch-blade 26.

It will be observed that my reciprocating motor is an exceedingly simple one, only a single coil being employed. The circuit making and breaking device is such that it will automatically make and break the circuit to the motor-coil as long as the circuit to the motor is closed. This circuit making and breaking device is of such a nature that there is an appreciable interval of time between the breaking of the circuit and the time when it is again made, thus giving opportunity for the motor-core to move entirely to its retracted position in order that in its next forward stroke it will attain the maximum momentum; but the current is maintained only a short period, thus preventing the heating of the coil, as would be the case if it were maintained a longer time. The circuit making and breaking device therefore can properly be termed a "time-interval" device—that is, a device which will not only break and make the circuit, but one which will do this in such a manner as to allow an appreciable interval of time between the breaking and the next making of the circuit.

My motor system will operate with either a direct or an alternating current and serves to interrupt the same into periods of the desired frequency.

What I claim is—

1. In an electric-motor system, the combination with a reciprocating motor having a single coil, of a circuit therefor, and a time-interval circuit-breaker in said circuit arranged to automatically break and make said circuit, said circuit-breaker being arranged to maintain the circuit to the coil only momentarily.

2. In an electric-motor system, the combination with a single motor-coil, of a reciprocating armature therefor, a spring for retracting said armature, a circuit for said coil, and a time-interval circuit-breaker in said circuit and arranged to automatically break and make the circuit, said circuit-breaker being arranged to maintain the circuit to the coil only momentarily.

3. In an electric-motor system, the combination with a reciprocating motor having a single coil, of a circuit therefor, and a time-interval circuit-breaker in series in said circuit and arranged to automatically break and make the same, said circuit-breaker being arranged to maintain the circuit to the coil only momentarily.

4. In an electric-motor system, the combination with a reciprocating motor having a single coil, of a circuit to said motor, contacts in series in said circuit, a magnet in the circuit, an armature for said magnet, and connections between said armature and the contacts whereby the presence of current on the circuit will break the latter.

5. In an electric-motor system, the combination with a reciprocating motor having a single coil, a circuit to said coil, a circuit-closer in said circuit arranged to close by gravity, a magnet in the circuit, an armature for said magnet, and connections between said armature and circuit-closer whereby the presence of current on the circuit will break the latter.

6. In an electric-motor system, the combination with a motor-coil, of a reciprocating armature therefor, a spring for retracting said armature, a circuit to said coil, and a circuit-breaker in said circuit and comprising a movable contact arranged to close by gravity, a magnet in the circuit, an armature therefor, connections between the armature and movable contact whereby the presence of current on the circuit will open said contact, and means for adjusting the opening movement of said contact.

7. In an electric-motor system, the combination with a reciprocating motor, of a circuit to said motor, a circuit-breaker in said circuit comprising a movable contact arranged to close by gravity, a coöperating contact, a solenoid in the circuit, a core therefor connected to said movable contact, and an adjustable abutment against which said core will strike in the opening movement.

8. In an electric-motor system, the combination of a motor-coil, a reciprocating armature therefor, a circuit to said coil, contacts in series in said circuit, a solenoid in said circuit and arranged with its bore vertically, a vertically-movable core for said solenoid, and connections between said core and the contacts so arranged that the armature can move idly for a short distance and then move one of the contacts to break said circuit.

In testimony whereof I, the said ADOLPH F. CHRISTMAS, have hereunto set my hand.

ADOLPH F. CHRISTMAS.

Witnesses:
F. W. WINTER,
ROBERT C. TOTTEN.